UNITED STATES PATENT OFFICE.

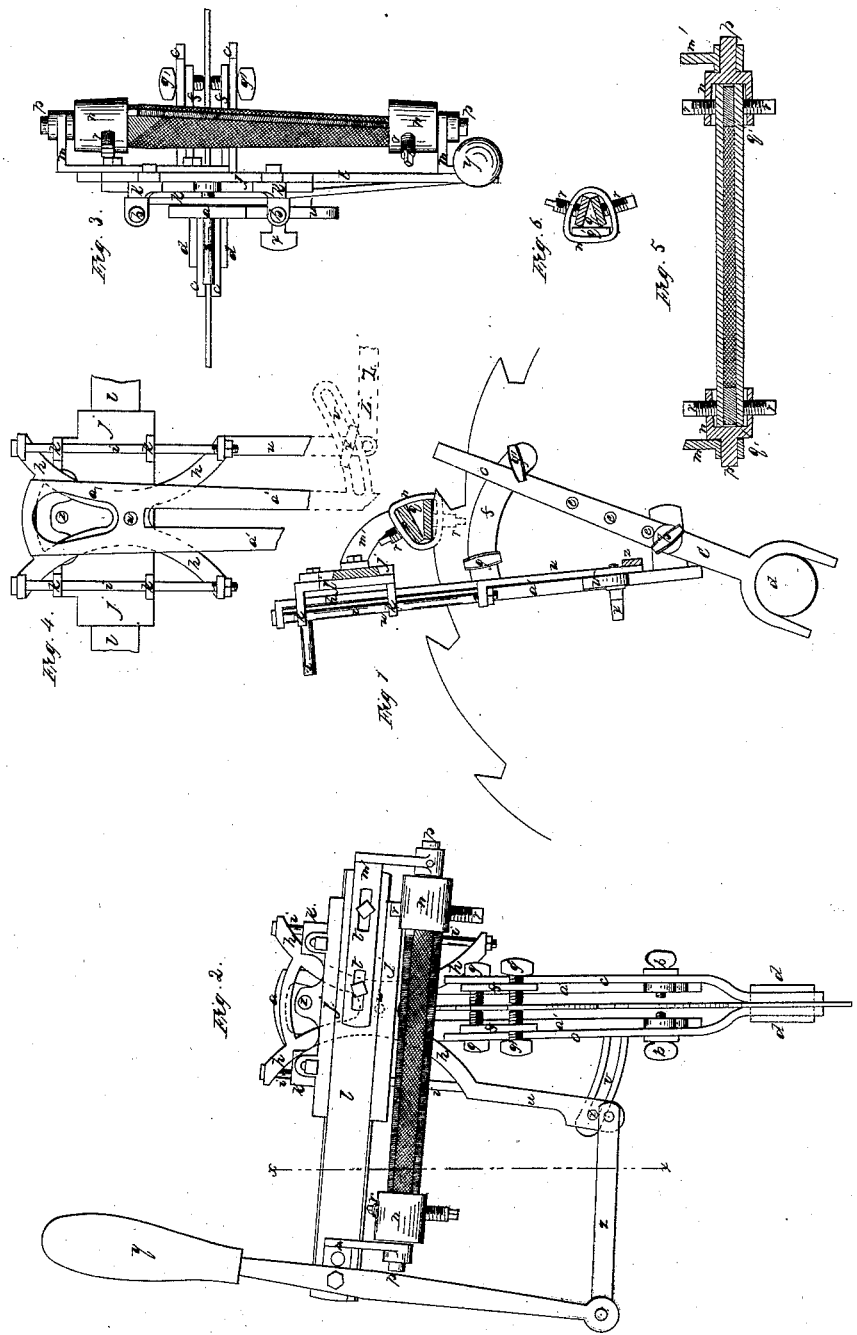

A. M. BEARDSLEY, OF WHITE PIGEON, MICHIGAN.

SAW-FILER.

Specification of Letters Patent No. 18,378, dated October 13, 1857.

*To all whom it may concern:*

Be it known that I, A. M. BEARDSLEY, of White Pigeon, in the county of St. Joseph and State of Michigan, have invented certain new and useful Improvements in Implements for Filing Saws; and I do hereby declare the following to be a full, clear, and exact description thereof, reference being had to the accompanying drawing of the same, making part of this specification, and in which—

Figure 1, represents a face view of a fragment of a circular saw, with my improved implement applied thereto, the files and their carriage being bisected at the line *x x* of Fig. 2. Fig. 2, represents a view of the same in a position at right angles to that shown in Fig. 1. Fig. 3, represents a plan or top view of the same. Fig. 4 represents a fragmentary view, showing more clearly the centrally pivoted plate, whereby the adjustment of the files is effected, for giving to each tooth the required bevel. Fig. 5, represents a longitudinal section of the files, and their holders, showing the manner of securing the files and adjusting the relative angles thereof, to adapt them to teeth of different sized saws. Fig. 6, represents a section of the files, showing the manner of securing their small ends into the holder.

The implement shown in the accompanying drawing differs essentially from that for which Letters Patent were granted to me on the third day of February, A. D. 1857, and from all others with which I am acquainted, in the points of invention briefly noticed in the following declaratory paragraphs, viz: 1st, the employment of a vertical centrally pivoted plate for supporting and carrying the file carriage, and adjusting the latter in such manner as to incline the files to the right or left, for the purpose of filing and beveling one-half of the teeth of the saw in one direction, and the other half in the opposite direction, by simply changing the point of connection of the pivoted plate in an index or slot of a fixed plate, upon which the adjusting plate is mounted, whereby all the teeth of the saw are filed and beveled from right to left with accuracy and despatch, and without the necessity of a corresponding change in the position of the implement; 2d, the employment of a pair of removable extension legs, in connection with the implement, whereby it is adapted to file circular saws of varying diameters, said extension legs resting and turning upon the collars of the saw shaft, in such manner as to support the implement in its back and forward motions, and in its adjustment from one tooth to another until the whole number are finished; 3rd, regulating and governing the pitch or hook in filing the teeth of saws, by arranging and sustaining the implement or plate upon which the file-carriage is mounted, at a suitable angle to the radial extension legs as shown in Fig. 1, whereby the files are caused to assume the same angle in adjusting themselves to the throat or hook of each tooth, by reason of the leaning or tangential position of the main or back plate of the implement; 4th, securing the files in their holders in such manner that they can be adjusted to vary the relative angles thereof, to adapt them to the teeth of different sized saws and also, by which they may be turned over so as to bring their adjacent unworn sides in the place of the others when worn dull, and lastly, mounting the files in removable holders, furnished with short shanks, whereby they may be shifted or reversed end for end, so as to use both directions of the thread or cuts of the files and without disturbing the relative angles thereof, thus utilizing the entire surface or cutting property of the flat files.

In Fig. 1, of the drawing, the implement is represented as adjusted to the proper position for commencing the operation of filing a tooth of a circular saw. It is composed of a strong back plate *a* having its lower portion slit or divided into two legs *a′*, *a′*, so as to leave a space between them to receive the saw blade. To the upper portion of this back plate the file carriage and adjusting plate are mounted, while its lower ends or legs are secured by means of set screws *b* to a pair of radial extension legs *c* arranged on each side of the saw, having curved or forked ends which fit over or embrace the collars *d* of the saw shaft, upon which they rest and turn as a center, thereby supporting the implement in its back and forward motions over the tooth, as well as in adjusting it from one tooth to another. These radial extension legs *c* project from the collars of the saw beyond the circumference of the same, and are furnished with a series of holes *e* into any one of which the screws *b* may be adjusted to shift the point of connection between the legs $a'$ and extension legs $c$, so as to adapt the implement to large or small sized saws. A curved bracket $f$ extends from the upper portion of each leg $a'$ and is fitted with two set screws $g'$, $g'$, which, when screwed flush with the saw face, as shown in Figs. 2 and 3, keep the brackets parallel to the face of the saw, and steady the implement in its back and forward motions. By reference to Fig. 1, it will be seen that the extension legs $c$ radiate from the center of the saw, while the main back plate $a$ is tangential to a circle concentric with the saw and therefore stands at an angle to the extension legs. In this position, however, the main plate $a$ and extension legs $c$ would open like a pair of shears, the set screws $l$ serving as the hinge, and to prevent this, the extension legs must rest against the set screws $g'$ of the brackets $f$, so as to maintain the proper angular position of the parts, the weight of the main plate and file carriage being sufficient for this purpose. The object of this arrangement is to regulate the pitch or hook of the teeth and make them all alike, which is effected by carrying the files so that they will always present the same angular position to the throat or hook of each tooth because the leaning or tangential position of the back plate tends always to govern the position of the files. The same adjustment of the extension legs for large or small sized saws, also governs the pitch or hook of the teeth of such saws, as in the instance represented, in which the extension legs are adjusted for a small sized saw.

To the upper portion of the back plate $a$ is centrally pivoted a skeleton front plate $h$, the extremities of which carry two parallel rods $i$ at opposite sides of the plate $a'$ upon which the file carriage way or bed is mounted by means of ears $k$. The file carriage is composed of a plate $l$ fitted in the bed or way $j$, so as to reciprocate horizontally and from each end thereof extends a bracket $m$ $m'$, curving downward and having their extremities perforated with a round eye, the axes of which coincide and is parallel to the carriage way. In the eyes of these brackets are fitted the round shanks $p$ of the file holders $n$, the latter being triangular in form and open at one end, into which the ends of the two files are secured in such relative positions as to be the counterpart of the throat or hook of the teeth to be filed by means of wedges $q$ placed between their adjacent faces, and clamp screws $r$ fitted into the opposite sides of the holders $n$ so as to bear against the ends of the files and firmly clamp them together. An additional wedge $q'$ is used to secure the small ends of the files, as shown in Fig. 6. By this method of securing the files it will be seen they can be so adjusted as to vary the relative angles thereof to suit different sized teeth by simply using a large or small wedge or core $q$, so as to increase or diminish the relative angles of the files, and then setting up the clamp screws tightly. Another advantage arising from this method is, that I am enabled to change or reverse the files in their holders, as that when one side of each file shall become dull or worn, they may be turned over so as to make the two adjacent or uneven sides to become the outer or working sides. The files being firmly set and mounted in removable holders, enables the operator to shift or reverse them end for end without disturbing the relative angles of the files for the purpose of using the files in both directions of their cuts or threads. The curved bracket $m'$ is furnished with slots $t$ and set screws, by which it may be adjusted to different lengths of files, or to allow the file holders to be taken out to be reversed longitudinally.

The adjustment of the files to the right or left for giving the required bevel to the front and back of teeth is effected in the following manner, viz: A branch arm $w$ extends from one side of the pivoted plate $h$ and is connected to a fixed index or slot $v$ whose radius is the pivot $w$ of the adjusting plate $h$, by means of a set screw $x$, so that when the set screw is adjusted to one extreme of the slot $v$ as in Fig. 2, the pivoted plate turns upon its center and inclines the files toward the right, and in this position the top and front of every other tooth is filed and beveled, and when the set screw $x$ is adjusted into the other extreme of the slot $v$ the files will be inclined in the opposite direction to that seen in Fig. 2, which will file the remaining teeth of the saw and bevel them toward the left. One of the principal advantages derived from this arrangement of the pivoting adjusting plate is, that the opposite bevels of all the teeth are filed without changing the position of the implement from one side of the saw to the other when once mounted upon the collars of the saw. By setting the screw intermediately in the slot $v$, the files will be brought to a horizontal position for straight or square filing, as shown in Fig. 3.

The files are reciprocated by means of a lever $y$ pivoted to the file-carriage, and connected by means of a link $z$ at its lower end to the branch arm $w$ of the pivoted adjusting plate. The attendant operates this lever with his right, while with his left hand he holds and moves the implement back and forward over the tooth by means of a pin $z'$ projecting from the carriage-way and by which he also lifts the file-carriage from one tooth to another.

When the implement is to be adjusted to mill or hand saws the extension legs are removed and the set screws $b$ screwed tight against the blade of the saw; these screws $b$ then become the hinge upon which the implement moves back and forth over the teeth. In order to bevel the teeth of straight saws, the four screws $q$ and $q'$ are so adjusted as to incline the files horizontally to the right or left; but, as this adjustment is common to most saw filing machines, I deem it unnecessary to describe it. In filing saws which require no bevel I commence at either end of the saw and finish the teeth in regular order. For heavy work, I contemplate operating the files by mechanical power.

What I claim as my invention and desire to secure by Letters Patent is—

1. The arrangement of the centrally pivoted plate for carrying and supporting the file carriage, in combination with the adjusting index and set screw whereby the adjustment of the files for filing the right and left bevels of the teeth is effected without shifting or changing the implement from one side of the saw to the other as herein described.

2. The employment of a pair of removable extension legs in combination with the implement, whereby it is adapted to file circular saws of varying diameters in the manner herein set forth.

3. Arranging and sustaining the implement or main plate upon which the file carriage is mounted at an angle to the radial extension legs, as shown in Fig. 1, for the purpose of regulating or governing the pitch or hook of the teeth being filed, in the manner herein set forth.

4. Securing the files in their holders in such manner that they can be adjusted to vary the relative angles thereof and to adapt them to the teeth of different sized saws, as herein fully described.

5. Mounting the two files in removable holders so that they can be taken out of the brackets which support them, and be reversed longitudinally without disturbing the relative angles or set of the files, as herein described.

In testimony whereof, I have hereunto subscribed my name.

A. M. BEARDSLEY.

In the presence of—
  I. S. HAMILTON,
  G. W. CALLENDER,
  C. C. WOODBURY.